US011618498B2

(12) United States Patent
Mine (10) Patent No.: US 11,618,498 B2
(45) Date of Patent: Apr. 4, 2023

(54) STEERING DEVICE

(71) Applicant: SUBARU CORPORATION, Tokyo (JP)

(72) Inventor: Ryuma Mine, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 315 days.

(21) Appl. No.: 16/841,304

(22) Filed: Apr. 6, 2020

(65) Prior Publication Data

US 2020/0385053 A1 Dec. 10, 2020

(30) Foreign Application Priority Data

Jun. 6, 2019 (JP) ............................. JP2019-106076

(51) Int. Cl.
*B62D 5/04* (2006.01)
*B60W 60/00* (2020.01)
*G05D 1/02* (2020.01)
*B62D 6/00* (2006.01)

(52) U.S. Cl.
CPC ....... *B62D 5/0475* (2013.01); *B60W 60/0013* (2020.02); *B62D 6/001* (2013.01); *G05D 1/0212* (2013.01); *B60W 2540/223* (2020.02)

(58) Field of Classification Search
CPC .... B62D 5/0475; B62D 6/001; B62D 15/025; B62D 6/002; B62D 5/0457; B62D 5/0463; B60W 60/0013; B60W 2540/223; G05D 1/0212
USPC ................... 701/41; 700/55, 38, 39; 116/31; 180/6.2, 204; 280/5.5
See application file for complete search history.

(56) References Cited

U.S. PATENT DOCUMENTS

| 6,107,767 A | 8/2000 | Lu et al. |
| 9,533,687 B2 * | 1/2017 | Lisseman ............. H04N 5/2252 |
| 2003/0024759 A1 * | 2/2003 | Williams ............. B62D 5/0463 180/443 |
| 2007/0055425 A1 | 3/2007 | Oya et al. |

(Continued)

FOREIGN PATENT DOCUMENTS

| JP | 11-313497 A | 11/1999 |
| JP | 2005-082034 A | 3/2005 |

(Continued)

OTHER PUBLICATIONS

Japanese Notice of Reasons for Refusal issued in corresponding Japanese Patent Application No. 2019-106076, dated Feb. 8, 2023, with English translation.

*Primary Examiner* — Elaine Gort
*Assistant Examiner* — Ellis B. Ramirez
(74) *Attorney, Agent, or Firm* — McDermott Will & Emery LLP (57) ABSTRACT

A steering apparatus includes an actuator and an actuator controller. The actuator is configured to generate an output for turning a steerable wheel of a vehicle. The actuator controller is configured to control the actuator in accordance with a steering input. The actuator controller includes a filtering processor configured to perform filtering processing for reducing or cutting a component in a predetermined frequency band from the steering input, and the actuator controller is configured to control the actuator in accordance with the steering input after the filtering processing.

5 Claims, 5 Drawing Sheets

(56) References Cited

U.S. PATENT DOCUMENTS

| | | | |
|---|---|---|---|
| 2012/0169503 A1* | 7/2012 | Wu | G08B 21/06 |
| | | | 340/575 |
| 2015/0066299 A1 | 3/2015 | Jang | |
| 2015/0262484 A1* | 9/2015 | Victor | G09B 9/04 |
| | | | 701/1 |
| 2016/0229450 A1* | 8/2016 | Basting | B62D 5/0472 |
| 2017/0327110 A1* | 11/2017 | Inoue | B60W 10/20 |
| 2018/0056863 A1* | 3/2018 | Nakahata | B60Q 9/00 |
| 2019/0337556 A1 | 11/2019 | Tsubaki | |
| 2020/0189582 A1* | 6/2020 | Fukushige | B60W 10/18 |

FOREIGN PATENT DOCUMENTS

| | | |
|---|---|---|
| JP | 2005130560 A * | 5/2005 |
| JP | 2008-001289 A | 1/2008 |
| JP | 2010-030391 A | 2/2010 |
| JP | 2013-189064 A | 9/2013 |
| JP | 2016-178776 A | 10/2016 |
| WO | 2018/070511 A1 | 4/2018 |

\* cited by examiner

STEERING DEVICE

CROSS-REFERENCE TO RELATED APPLICATIONS

The present application claims priority from Japanese Patent Application No. 2019-106076 filed on Jun. 6, 2019, the entire contents of which are hereby incorporated by reference.

BACKGROUND

The disclosure relates to a steering apparatus provided in a vehicle, such as an automobile.

As the related art for suppressing vibrations and so on that an occupant feels uncomfortable with to improve ride comfort in the vehicle, such as the automobile, for example, Japanese Unexamined Patent Application Publication (JP-A) No. 2013-189064 describes the following technique. An image of an area including the head of the occupant is captured with an in-vehicle camera and body pressure on the seat is detected to determine an unstable state of the seating position of the occupant. Then, to prevent the head and the upper body from being shaken in the front-back direction, the control gain of damping force of the suspension at around 0.5 to 2 Hz, which is the resonance frequency of the head and the upper body in the front-back direction, is made larger to increase the damping force.

JP-A No. 2016-178776 describes a technique in which the attitude state of a vehicle and a human head state regarding the angle of the neck of the driver are detected to control the driving force of the vehicle so as to suppress the amount of change in the angle of the neck of the driver.

JP-A No. 2008-1289 describes a technique in which, in accordance with a change in the front-back acceleration experienced by a vehicle in response to an acceleration request from an occupant, the seat back or the headrest is driven by an actuator to suppress resonating of the head of the occupant.

SUMMARY

An aspect of the disclosure provides a steering apparatus including an actuator and an actuator controller. The actuator is configured to generate an output for turning a steerable wheel of a vehicle. The actuator controller is configured to control the actuator in accordance with a steering input. The actuator controller includes a filtering processor configured to perform filtering processing for reducing or cutting a component in a predetermined frequency band from the steering input. The actuator controller is configured to control the actuator in accordance with the steering input after the filtering processing.

An aspect of the disclosure provides a steering apparatus including an actuator and circuitry. The actuator is configured to generate an output for turning a steerable wheel of a vehicle. The circuitry is configured to control the actuator in accordance with a steering input. The circuitry is configured to perform filtering processing for reducing or cutting a component in a predetermined frequency band from the steering input. The circuitry is configured to control the actuator in accordance with the steering input after the filtering processing.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the disclosure.

DETAILED DESCRIPTION

The related art described above might not fully take into consideration a situation where the head of an occupant vibrates due to the behavior of the vehicle caused by steering, which is the source of vibrations and, as a consequence, ride comfort may be compromised or motion sickness may be induced.

In particular, in a case where the steering operation is performed autonomously in accordance with control by the vehicle without a driver's operation, vehicle vibrations with which the head of an occupant can resonate may occur due to a steering operation not intended by the driver, which may provide discomfort or the like to the occupant.

Accordingly, it is desirable to provide a steering apparatus that suppresses vibrations of the head of an occupant caused by steering of the vehicle.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

A steering apparatus 1 according to the embodiment is provided in an automobile, such as a car, to steer the front wheels, which are steerable wheels.

Figure 1:
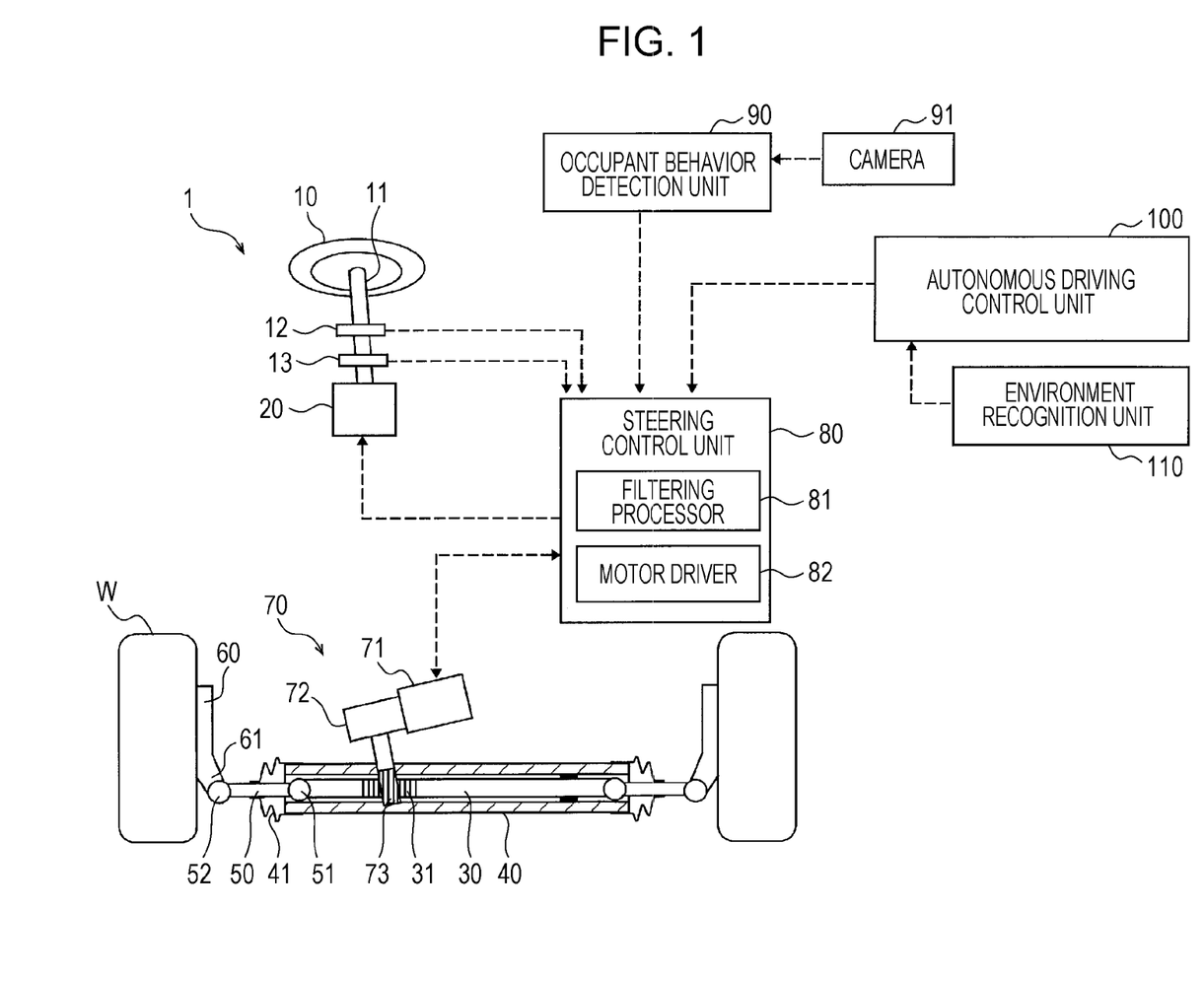
FIG. 1 is a block diagram schematically illustrating a configuration of a steering apparatus according to an embodiment of the disclosure.

FIG. 1 is a block diagram schematically illustrating a configuration of the steering apparatus 1 according to the embodiment.

The steering apparatus 1 is a steer-by-wire apparatus and includes a steering wheel 10, a reacting force generating device 20, a rack shaft 30, a rack housing 40, a tie rod 50, a knuckle 60, an actuator unit 70, and a steering control unit 80.

To the steering control unit 80, an occupant behavior detection unit 90 and an autonomous driving control unit 100 are coupled.

The steering wheel 10 is a ring-shaped operation member (steering input member) that is rotated by the driver to input a steering operation.

The steering wheel 10 is disposed so as to face the driver's seat in the cabin of the vehicle.

The steering wheel 10 is provided with a steering shaft 11, a steering angle sensor 12, and a torque sensor 13.

The steering shaft 11 is a rotating shaft, and one end thereof is attached to the steering wheel 10.

The steering angle sensor 12 is an amount-of-steering-operation detector provided in the middle part of the steering shaft 11 to detect the angle-of-rotation position of the steering shaft 11.

The torque sensor 13 is provided in the middle part of the steering shaft 11 in an area on the side of the reacting force generating device 20 relative to the steering angle sensor 12 and detects a torque (power for operating or holding the steering wheel 10 by the driver) exerted on the steering shaft 11.

Outputs from the steering angle sensor 12 and the torque sensor 13 are transmitted to the steering control unit 80.

The reacting force generating device 20 is an actuator unit that applies a torque to the steering shaft 11 in accordance with a command from the steering control unit 80 to generate pseudo self-aligning torque.

The output shaft of the reacting force generating device 20 is coupled to an end of the steering shaft 11 opposite to the side of the steering wheel 10.

The rack shaft 30 is a columnar member disposed such that the longitudinal direction (axial direction) thereof extends in the vehicle-width direction.

The rack shaft 30 is supported so as to be translational in the vehicle-width direction relative to the vehicle body.

The rack shaft 30 includes, in a part thereof, a rack gear 31 that meshes with a pinion gear of a pinion shaft 73.

In response to rotation of the steering shaft 11, the rack gear 31 is driven by the pinion gear, and the rack shaft 30 translates (moves straight) in the vehicle-width direction.

The rack housing 40 is a substantially cylindrical member that houses the rack shaft 30 while supporting the rack shaft so as to be relatively displaceable in the vehicle-width direction.

The rack housing 40 constitutes a steering gearbox in conjunction with the rack shaft 30, the pinion shaft 73, and so on.

On either end of the rack housing 40, a rack boot 41 is provided.

The rack boot 41 is a member that allows relative displacement of the tie rod 50 relative to the rack housing 40 and that prevents foreign matters, such as dust, from entering the rack housing 40.

The rack boot 41 is a pleated flexible tube formed of a resin material, such as an elastomer.

The tie rod 50 is an axial interlocking member that couples an end of the rack shaft 30 and a knuckle arm 61 of the knuckle 60 to each other and that rotates the knuckle 60 about the kingpin axis in accordance with movement of the rack shaft 30 in the translation direction in an interlocking manner.

The end of the tie rod 50 on the inner side in the vehicle-width direction is coupled to the end of the rack shaft 30 via a ball joint 51 so as to be swayable.

The end of the tie rod 50 on the outer side in the vehicle-width direction is coupled to the knuckle arm 61 of the knuckle 60 via a ball joint 52.

In a part in which the tie rod 50 and the ball joint 52 are coupled to each other, a turnbuckle mechanism for toe-in adjustment is provided.

The knuckle 60 is a member that houses a hub bearing that supports a hub (not illustrated) to which a wheel (front wheel) W, which is a steerable wheel, is attached so as to be rotatable about the axle.

The knuckle 60 includes the knuckle arm 61 that protrudes forward relative to the axle.

The knuckle 60 is supported so as to be rotatable about the kingpin axis, which is a predetermined central rotation axis.

In a case where the front suspension of the vehicle is a MacPherson strut suspension, the kingpin axis is a virtual axis that couples the bearing center of the strut top mount and the center of a ball joint coupling the lower part of the knuckle 60 and the lower arm to each other.

The knuckle 60 is pushed and pulled by the rack shaft 30 via the tie rod 50 in the vehicle-width direction and rotates about the kingpin axis to thereby turn the wheel W.

The actuator unit 70 is an actuator that rotates and drives the pinion shaft 73 to generate rack thrust for a steering operation.

The actuator unit 70 includes a motor 71, a gearbox 72, and the pinion shaft 73.

The motor 71 is an electric actuator that generates driving force to be applied to the pinion shaft 73.

The rotation direction and output torque of the motor 71 are controlled by a motor driver 82 of the steering control unit 80.

The motor 71 includes a position sensor (not illustrated) that detects the output-shaft angular position (angle of rotation). The detected output-shaft angular position is fed back to the steering control unit 80.

The motor 71 is controlled so that the actual steering angle of the vehicle matches a target steering angle set by the steering control unit 80.

The gearbox 72 includes reducing gears that reduce (amplify torque) and transmit to the pinion shaft 73 the rotation output of the motor 71.

The pinion shaft 73 is a rotating shaft that is rotated and driven by the motor 71 via the gearbox 72.

The pinion shaft 73 includes, in a distal end thereof, the pinion gear that meshes with the rack gear 31 of the rack shaft 30 to drive the rack shaft 30.

The steering control unit 80 is a control device that gives the motor 71 command values of the rotation direction and output torque.

The steering control unit 80 includes, for example, an information processor, such as a central processing unit (CPU), memories, such as a random access memory (RAM) and a read-only memory (ROM), an input/output interface, and a bus that couples these components to each other.

In one embodiment, the steering control unit 80 may serve as an "actuator controller".

The steering control unit 80 includes a filtering processor 81 and the motor driver 82.

During autonomous driving in which the vehicle autonomously travels in accordance with control by the autonomous driving control unit 100, the steering control unit 80 drives the motor 71 in accordance with a steering control schedule (steering input waveform) set by the autonomous driving control unit 100 to control the steering angle of the vehicle.

During manual driving in which the vehicle travels in accordance with a driving operation by the driver, the steering control unit 80 uses outputs from the steering angle sensor 12 and the torque sensor 13 as steering inputs and controls the steering angle of the vehicle on the basis of these inputs.

The filtering processor 81 performs filtering processing for cutting components in a predetermined frequency band from the steering input waveform. This filtering processing will be described in detail below.

The motor driver 82 gives the motor 71 a driving signal to drive the motor 71 on the basis of the steering input waveform after filtering processing by the filtering processor 81.

To the steering control unit 80, the occupant behavior detection unit 90 and the autonomous driving control unit 100 are coupled.

The occupant behavior detection unit 90 detects the behavior of an occupant including at least motion of the head on the basis of image data obtained by capturing an image of the occupant with a camera 91.

The camera 91 is, for example, a single-lens camera or a stereo camera built in the instrument panel in the cabin of the vehicle.

The occupant behavior detection unit 90 has a function of detecting, by image processing, the presence of vibrations of the head of the occupant in the yaw direction and the roll direction and, in a case where the head is vibrating, the frequency of the vibrations.

In one embodiment, the occupant behavior detection unit 90 may serve as a "head behavior detector" and a "frequency detector".

The autonomous driving control unit 100 generates an autonomous driving scenario including the target travel path, target vehicle speed, target acceleration/deceleration, and so on of the vehicle on the basis of the environment around the vehicle recognized by an environment recognition unit 110.

The autonomous driving control unit 100 controls, for example, an engine control unit, a transmission control unit, a hydraulic unit that controls breaking force of a hydraulic break, and so on in accordance with the autonomous driving scenario to control the travel speed, acceleration and deceleration in the front-back direction, and so on of the vehicle.

The autonomous driving control unit 100 generates the steering control schedule so that the vehicle traces the target travel path, and transmits the steering control schedule to the steering control unit 80.

In one embodiment, the autonomous driving control unit 100 may serve as a "target route setting unit" and a "steering input setting unit".

The environment recognition unit 110 uses various sensors, such as a stereo camera device, a millimeter-wave radar device, and a Light Detection and Ranging (LiDAR) device, to detect the shapes of roads, the shapes of lane-dividing lines (lane lines), obstacles, such as other vehicles and pedestrians, and so on around the vehicle and recognize the environment around the vehicle.

The results of recognition by the environment recognition unit 110 are transmitted to the autonomous driving control unit 100.

Now, operations of the steering apparatus 1 according to the embodiment during autonomous driving will be described. In the steering apparatus 1 according to the embodiment, in a case where motion, of the head of an occupant, equal to or larger than a predetermined value is detected during autonomous driving (autonomous steering), predetermined filtering processing is performed on the steering input waveform generated by the autonomous driving control unit 100 to drive and control the motor 71 on the basis of the steering input waveform after the filtering processing.

Figure 2:
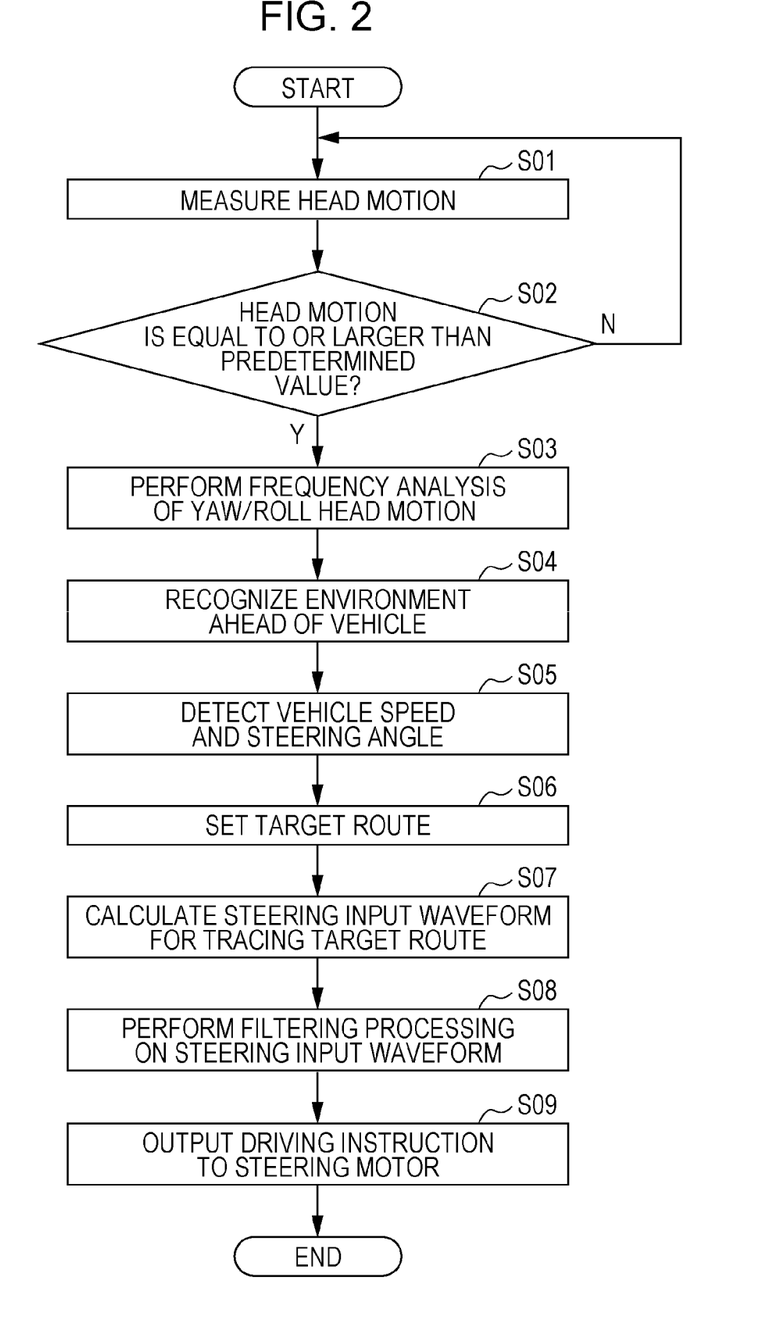
FIG. 2 is a flowchart illustrating control in the steering apparatus according to the embodiment.

FIG. 2 is a flowchart illustrating control by the steering apparatus 1 according to the embodiment.

The steps are sequentially described below.

Step S01: Measure Head Motion

The occupant behavior detection unit 90 measures motion of the head of an occupant (for example, the driver) on the basis of a captured image obtained by the camera 91.

Thereafter, the flow proceeds to step S02.

Step S02: Determine Amount of Head Motion

The occupant behavior detection unit 90 determines whether vibrations of the head having a predetermined amplitude or more are present in the yaw direction or in the roll direction in the motion of the head of the occupant measured in step S01.

In a case where vibrations having the predetermined amplitude or more are present, the flow proceeds to step S03. Otherwise, the flow returns to step S01 and the process is repeated.

Step S03: Perform Frequency Analysis of Head Motion

The occupant behavior detection unit 90 uses, for example, a publicly available FFT analyzer to perform frequency analysis of the motion of the head of the occupant in the yaw direction or in the roll direction measured in step S01 (conversion to the frequency domain).

Thereafter, the flow proceeds to step S04.

Step S04: Recognize Environment Ahead of Vehicle

The environment recognition unit 110 performs environment recognition to recognize the shape of the road, obstacles, and so on ahead of the vehicle.

Thereafter, the flow proceeds to step S05.

Step S05: Detect Vehicle Speed and Steering Angle

The autonomous driving control unit 100 detects the current travel speed (vehicle speed) and steering angle of the vehicle.

The vehicle speed can be detected on the basis of, for example, an output signal from a vehicle speed sensor (not illustrated) that outputs a vehicle speed signal of a frequency proportional to the rotation speed of the wheels.

As the steering angle, a steering angle calculated on the basis of, for example, an output signal from the position sensor of the motor 71 can be obtained from the steering control unit 80.

Thereafter, the flow proceeds to step S06.

Step S06: Set Target Route

The autonomous driving control unit 100 sets the target route (target travel path) of the vehicle on the basis of the environment ahead of the vehicle recognized in step S04 and various types of information including the vehicle speed and steering angle obtained in step S05.

Thereafter, the flow proceeds to step S07.

Step S07: Calculate Steering Input Waveform

The autonomous driving control unit 100 calculates a steering input waveform (steering control schedule) for the vehicle to trace the target route set in step S06 and transmits the steering input waveform to the steering control unit 80.

Thereafter, the flow proceeds to step S08.

Step S08: Perform Filtering Processing on Steering Input Waveform

The steering control unit 80 uses the filtering processor 81 to perform filtering processing on the steering input waveform transmitted from the autonomous driving control unit 100 to cut a predetermined frequency band.

Figure 3:
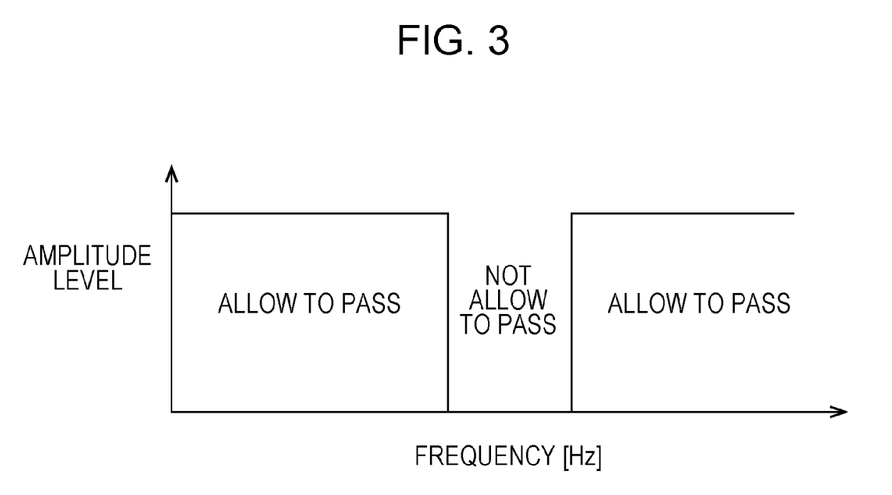
FIG. 3 is a diagram schematically illustrating the cutoff frequency characteristics of a filter of a filtering processor in the steering apparatus according to the embodiment.

FIG. 3 is a diagram schematically illustrating the cutoff frequency characteristics of a filter of the filtering processor 81 in the steering apparatus 1 according to the embodiment.

As illustrated in FIG. 3, the filtering processor 81 is configured as a band-elimination filter (band-stop filter or band-rejection filter) that attenuates components in a predetermined frequency band to a notably low level.

The filter constant of the filtering processor 81 is set so that the rejected frequency band includes the oscillation frequency of the head of the occupant in the yaw direction and that in the roll direction obtained in step S03.

The oscillation frequency of the head of the occupant in the yaw direction and that in the roll direction are, for example, within a range of 1 to 5 Hz or so and are, for example, around 3 Hz in a case of an adult having a typical physique.

In a case where the oscillation frequency in the yaw direction and that in the roll direction are different, the filter constant is set so as to include the oscillation frequencies.

After the end of the filtering processing, the flow proceeds to step S09.

Step S09: Output Driving Instruction to Steering Motor

The motor driver 82 gives the motor 71 a driving instruction (control waveform) in accordance with the steering input waveform after the filtering processing generated in step S08 to cause the motor 71 to drive the rack shaft 30 (steering operation).

Thereafter, the series of processes ends (return).

Figure 4:
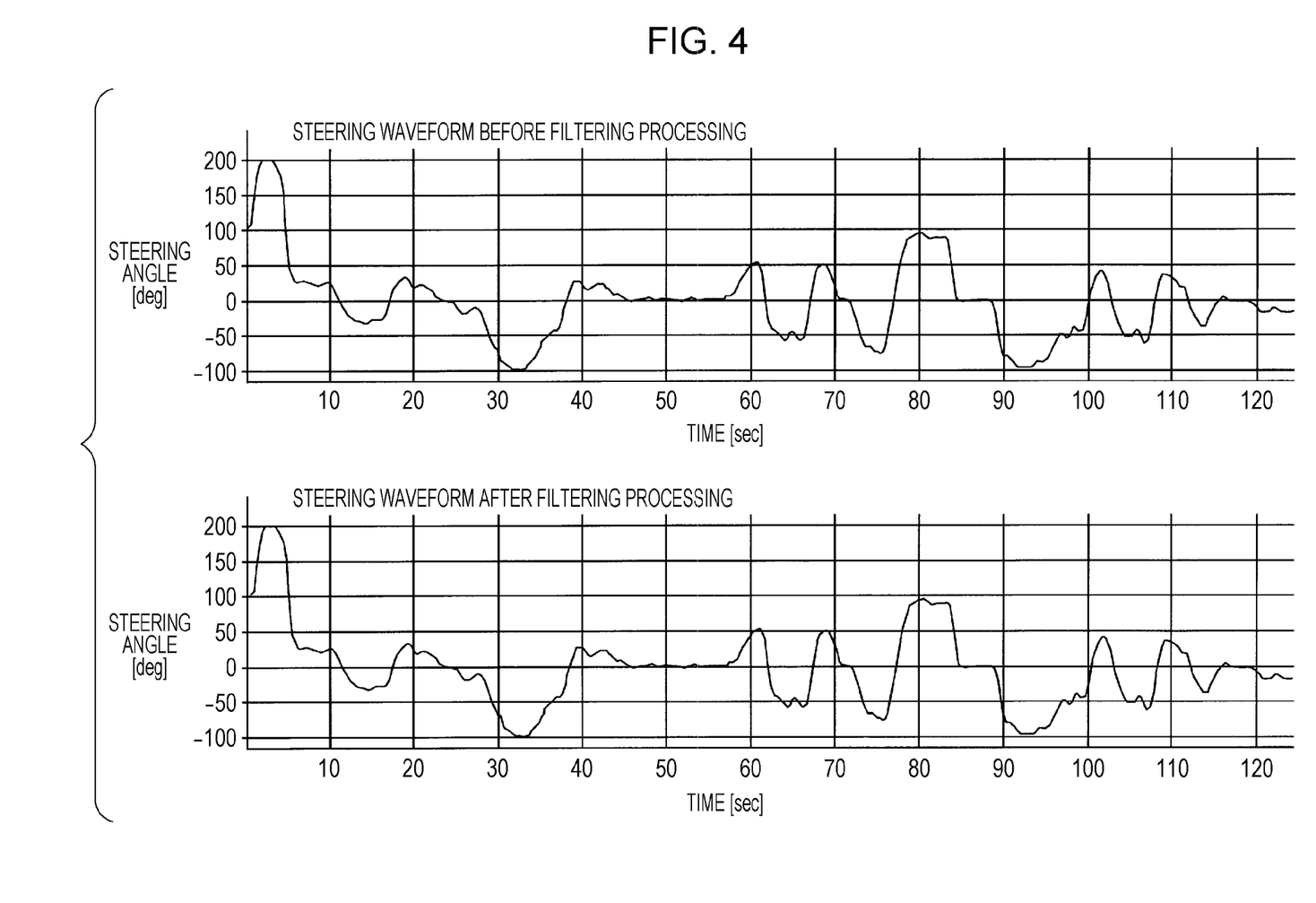
FIG. 4 includes diagrams of example logs of the steering angle during traveling of a vehicle and illustrates a steering waveform before filtering processing and a steering waveform after filtering processing.

FIG. 4 includes diagrams of example logs of the steering angle during traveling of the vehicle and illustrates a steering waveform before filtering processing and a steering waveform after filtering processing.

In FIG. 4, the upper diagram illustrates the steering waveform before filtering processing (the steering input waveform transmitted to the steering control unit 80 from the autonomous driving control unit 100), and the lower diagram illustrates the steering waveform after filtering processing (the steering input waveform output from the filtering processor 81).

Each diagram illustrates, for example, a steering waveform in a case of traveling the same circuit that includes discretely disposed right and left curved paths, where the horizontal axis of each diagram represents time and the vertical axis thereof represents the steering angle.

As illustrated in FIG. 4, even in a case of, for example, performing filtering processing for eliminating a frequency band around 3 Hz, the steering waveform before the filtering processing and the steering waveform after the filtering processing are not significantly different, and the travel line and so on of the vehicle are affected to a negligible degree.

Even in a case where the travel line of the vehicle is affected by the filtering processing, the autonomous driving control unit 100 updates the target travel path and the steering control schedule based on the target travel path as appropriate in accordance with the deviation of the actual path of the vehicle from the target travel path. Accordingly, a problem is less likely to occur in traveling of the vehicle.

Figure 5:
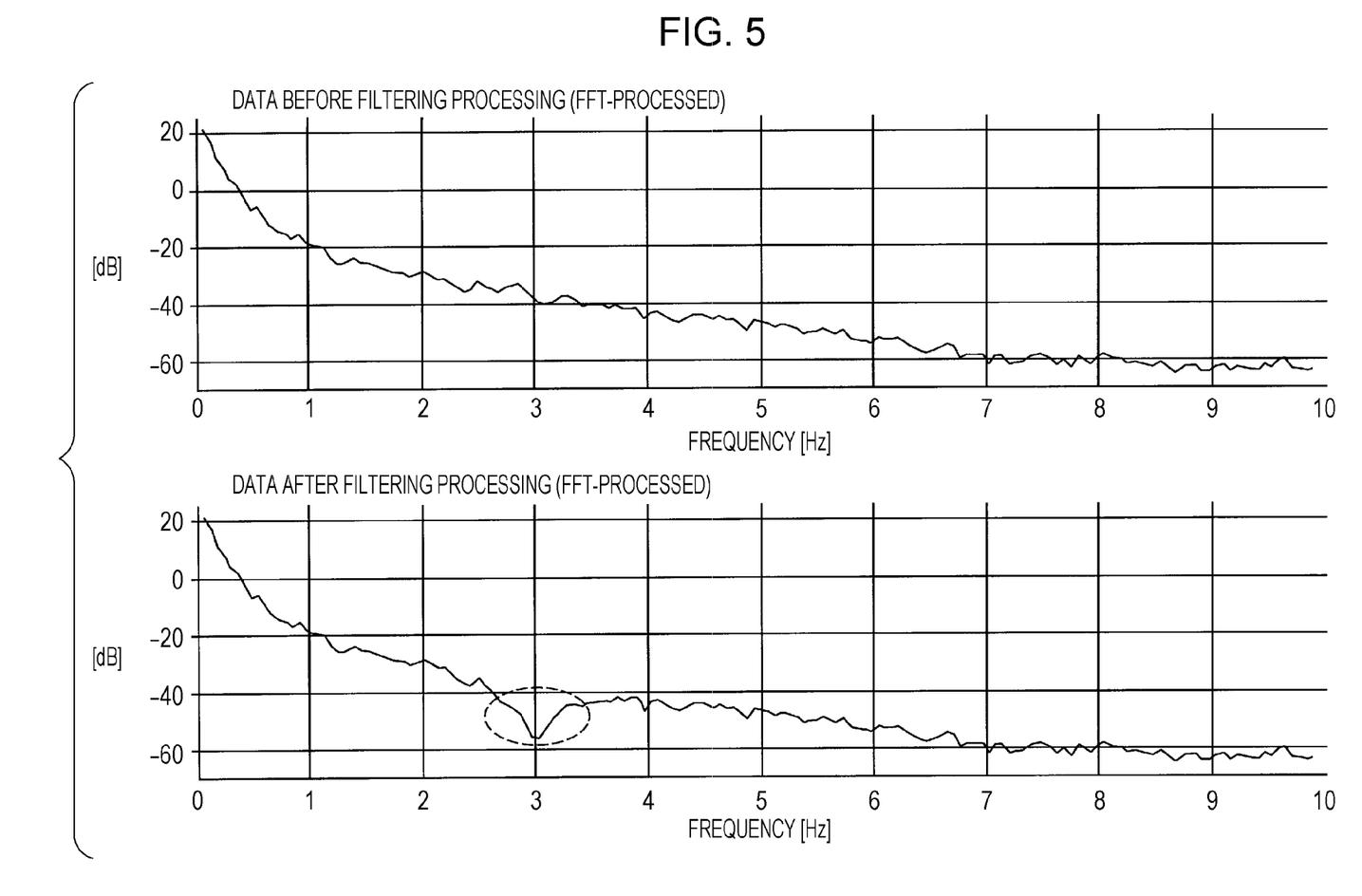
FIG. 5 includes diagrams illustrating frequency characteristics obtained by performing fast Fourier transform (FFT) processing on the steering waveforms illustrated in FIG. 4.

FIG. 5 includes diagrams illustrating frequency characteristics obtained by performing FFT processing on the steering waveforms illustrated in FIG. 4.

In FIG. 5, the upper diagram and the lower diagram are obtained by performing FFT processing on the steering waveform illustrated in the upper diagram and that illustrated in the lower diagram in FIG. 4 respectively to perform conversion to the frequency domain.

In each diagram in FIG. 5, the horizontal axis represents the frequency, and the vertical axis represents the amplitude level.

As is evident from a comparison between the upper diagram and the lower diagram, with the filtering processing, a reduction is observed in a domain around 3 Hz, which is a frequency band in which resonating of the head of the occupant may occur.

Such filtering processing for the steering input waveform can be performed even during manual driving in which the driver performs a steering operation.

In this case, the filtering processing is performed for the steering input waveform that is set by the steering control unit 80 on the basis of outputs from the steering angle sensor 12 and the torque sensor 13, and the motor 71 is controlled on the basis of the steering input waveform after the filtering processing.

As described above, with the embodiment, the following effects can be attained.

(1) Frequency components for which the head of an occupant can resonate are reduced or removed from the control waveform of the motor 71 that turns the wheel W, which is a steerable wheel, to thereby suppress motion of the head of the occupant and prevent a situation where the occupant feels uncomfortable about the ride or suffers motion sickness.

(2) The filter of the filtering processor 81 is set on the basis of the results of detection of the oscillation frequency of the head of the occupant by the occupant behavior detection unit 90 using a captured image obtained by the camera 91. Accordingly, the above-described effects can be attained.

(3) The filtering processor 81 eliminates a frequency band of 1 to 5 Hz, particularly, around 3 Hz. Accordingly, in a case where the occupant is an adult having a typical physique, a frequency band in which the head can resonate can be reduced or cut, and the above-described effects can be attained.

(4) The filtering processing is performed on the steering input waveform generated by the autonomous driving control unit 100 to control the motor 71. Accordingly, during autonomous driving in which the occupant is not involved in the steering operation, a situation where resonating of the head occurs due to steering not intended by the occupant and the occupant feels uncomfortable or suffers motion sickness can be prevented.

Modifications

The embodiment of the disclosure is not limited to the above-described embodiment, and various modifications and changes can be made. Such modifications and changes are also within the technical scope of the embodiment of the disclosure.

(1) The configurations of the steering apparatus, the suspension device, the vehicle, and so on are not limited to those in the above-described embodiment and can be changed as appropriate.

For example, the type of suspension and the disposition of the tie rod relative to the kingpin (forward or backward of the kingpin) can be changed as appropriate.

Further, the disposition of the motor and the configuration of the mechanism for transmitting power to the rack shaft are not particularly limited.

(2) In the embodiment, the steering apparatus is, for example, a steer-by-wire apparatus in which the steering wheel and the rack shaft are not mechanically interlocked. However, the embodiment of the disclosure is applicable to an existing (non-steer-by-wire) steering apparatus in which the steering wheel is mechanically coupled to the steering gearbox via the steering shaft.

Even in this case, components in a predetermined frequency band are cut or reduced from an output from an actuator that generates assist power to thereby suppress motion of the head of an occupant.

(3) In the embodiment, motion of the head of an occupant is detected by the occupant behavior detection unit and the filter constant of the filtering processor is set. In a case where a frequency band in which the head of an occupant can resonate is known, a preset frequency band may be reduced or cut by the filtering processing.

(4) In the embodiment, image processing of a captured image obtained by the camera is performed to detect motion of the head of an occupant. However, the method for detecting motion of the head of an occupant is not limited to this and can be changed as appropriate.

As described above, according to the embodiment of the disclosure, it is possible to provide a steering apparatus that suppresses vibrations of the head of an occupant caused by steering of the vehicle.

The steering control unit 80 illustrated in FIG. 1 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the steering control unit 80 including the filtering processor 81 and the motor driver 82. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIG. 1.

The invention claimed is:

1. A steering apparatus comprising:
a head behavior detector configured to detect a behavior of a head of an occupant of a vehicle;
a frequency detector configured to detect an oscillation frequency of the head of the occupant in a yaw direction or a roll direction of the vehicle using the detected behavior of the head of the occupant;
an actuator configured to generate an output for turning a steerable wheel of a vehicle; and
an actuator controller configured to control the actuator in accordance with a steering input,
wherein the actuator controller comprises a filtering processor configured to perform filtering processing for reducing or cutting a component in a predetermined frequency band from the steering input,
wherein the actuator controller is configured to control the actuator in accordance with the steering input after the filtering processing,
wherein the filtering processor is configured to reduce or cut a component in a frequency band that includes the oscillation frequency of the head of the occupant in the yaw direction or the roll direction of the vehicle, and
wherein the actuator controller is configured to:
determine whether an amplitude of an oscillation of the head of the occupant in the yaw direction or the roll direction in the detected behavior of the head of the occupant is equal to or greater than a predetermined value;
when the amplitude of the oscillation of the head of the occupant in the yaw direction or the roll direction is equal to or greater than a predetermined value, control the actuator in accordance with the steering input after the filtering processing; and
when the amplitude of the oscillation of the head of the occupant in the yaw direction or the roll direction is less than the predetermined value, control the actuator in accordance with the steering input before the filtering processing.

2. The steering apparatus according to claim 1, wherein at least part of the frequency band is set within a range of 1 Hz to 5 Hz.

3. The steering apparatus according to claim 2, further comprising:
an environment recognition unit configured to recognize an environment ahead of the vehicle;
a target route setting unit configured to set a target route on a basis of a result of recognition by the environment recognition unit; and
a steering input setting unit configured to set the steering input so that the vehicle traces the target route.

4. The steering apparatus according to claim 1, further comprising:
an environment recognition unit configured to recognize an environment ahead of the vehicle;
a target route setting unit configured to set a target route on a basis of a result of recognition by the environment recognition unit; and
a steering input setting unit configured to set the steering input so that the vehicle traces the target route.

5. A steering apparatus comprising:
a head behavior detector configured to detect a behavior of a head of an occupant of a vehicle;
a frequency detector configured to detect an oscillation frequency of the head of the occupant in a yaw direction or a roll direction of the vehicle using the detected behavior of the head of the occupant;
an actuator configured to generate an output for turning a steerable wheel of a vehicle; and
circuitry configured to:
control the actuator in accordance with a steering input;
perform filtering processing for reducing or cutting a component in a predetermined frequency band from the steering input; and
control the actuator in accordance with the steering input after the filtering processing,
wherein the filtering processing further comprises reducing or cutting a component in a frequency band that includes the oscillation frequency of the head of the occupant in the yaw direction or the roll direction of the vehicle, and
wherein the circuitry is configured to:
determine whether an amplitude of an oscillation of the head of the occupant in the yaw direction or the roll direction in the detected behavior of the head of the occupant is equal to or greater than a predetermined value;
when the amplitude of the oscillation of the head of the occupant in the yaw direction or the roll direction is equal to or greater than a predetermined value, control the actuator in accordance with the steering input after the filtering processing; and when the amplitude of the oscillation of the head of the occupant in the yaw direction or the roll direction is less than the predetermined value, control the actuator in accordance with the steering input before the filtering processing.

\* \* \* \* \*